US011595419B2

(12) United States Patent
Tanaka

(10) Patent No.: US 11,595,419 B2
(45) Date of Patent: Feb. 28, 2023

(54) COMMUNICATION MONITORING SYSTEM, COMMUNICATION MONITORING APPARATUS, AND COMMUNICATION MONITORING METHOD

(71) Applicant: HITACHI, LTD., Tokyo (JP)

(72) Inventor: Mayuko Tanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 406 days.

(21) Appl. No.: 16/954,946

(22) PCT Filed: Nov. 16, 2018

(86) PCT No.: PCT/JP2018/042430
§ 371 (c)(1),
(2) Date: Jun. 17, 2020

(87) PCT Pub. No.: WO2019/130894
PCT Pub. Date: Jul. 4, 2019

(65) Prior Publication Data
US 2020/0382541 A1 Dec. 3, 2020

(30) Foreign Application Priority Data

Dec. 28, 2017 (JP) .............................. JP2017-252939

(51) Int. Cl.
*G06F 15/16* (2006.01)
*H04L 9/40* (2022.01)
(Continued)

(52) U.S. Cl.
CPC ... *H04L 63/1425* (2013.01); *G06Q 10/06316* (2013.01); *G06Q 30/0185* (2013.01); *H04L 63/1416* (2013.01); *H04L 67/12* (2013.01)

(58) Field of Classification Search
CPC . H04L 63/1425; H04L 63/1416; H04L 67/12; G06Q 10/06316; G06Q 30/0185
See application file for complete search history.

(56) References Cited

U.S. PATENT DOCUMENTS 8,300,532 B1 * 10/2012 Venkatramani ....... H04L 45/306
370/235
9,485,262 B1 * 11/2016 Kahn ................... H04L 63/1433
(Continued)

FOREIGN PATENT DOCUMENTS

JP 2005352673 A 12/2005
JP 2011253355 A 12/2011
(Continued)

OTHER PUBLICATIONS

Kiuchi, M. et al "Intrusion Detection in Control Systems using Sequence Characteristics", IEEJ Transactions on Electronics, Information and Systems, 2012, pp. 14-20, vol. 132, No. 1; English abstract provided.
(Continued)

*Primary Examiner* — Oleg Survillo
(74) *Attorney, Agent, or Firm* — Procopio, Cory, Hargreaves & Savitch LLP

(57) ABSTRACT

An abuse using a legitimate communication used for executing a business sequence is detected.

A legitimate communication determination processing unit 22 determines whether or not a communication packet received by a communication destination device is a legitimate communication packet permitted by a monitoring target system 10 based on meta information extracted by a packet collection processing unit 21, a sequence packet identification processing unit 23 determines whether or not the communication packet determined to be the legitimate communication packet by the legitimate communication determination processing unit 22 is a communication packet
(Continued)

constituting the business sequence, and a sequence establishment determination processing unit 24 determines whether or not the business sequence related to the communication packet determined to constitute the business sequence by the sequence packet identification processing unit 23 is established.

12 Claims, 13 Drawing Sheets

(51) Int. Cl.
*G06Q 10/0631* (2023.01)
*G06Q 30/018* (2023.01)
*H04L 67/12* (2022.01)

(56) References Cited

U.S. PATENT DOCUMENTS

| | | | |
|---|---|---|---|
| 2005/0276230 A1* | 12/2005 | Akahane | H04L 43/00 370/252 |
| 2006/0064598 A1* | 3/2006 | Higashikado | H04L 63/0263 713/182 |
| 2009/0178140 A1* | 7/2009 | Cao | H04L 63/1416 726/23 |
| 2011/0173490 A1* | 7/2011 | Narayanaswamy | H04L 63/1408 714/4.11 |
| 2011/0302131 A1 | 12/2011 | Kawaba | |
| 2013/0042322 A1* | 2/2013 | Yoon | G06F 21/554 726/23 |
| 2013/0074183 A1* | 3/2013 | Yoon | H04L 63/1458 726/22 |
| 2015/0156102 A1* | 6/2015 | Szabo | H04L 43/50 709/224 |
| 2015/0262009 A1* | 9/2015 | Szabo | H04L 69/22 709/224 |
| 2017/0054751 A1 | 2/2017 | Schneider et al. | |
| 2017/0257386 A1* | 9/2017 | Kim | H04L 63/1425 |

FOREIGN PATENT DOCUMENTS

| | | |
|---|---|---|
| JP | 2016139232 A | 8/2016 |
| JP | 2017041886 A | 2/2017 |

OTHER PUBLICATIONS

International Search Report for related International Application No. PCT/JP2018/042430, dated Jan. 15, 2019; English translation provided (4 pages).

* cited by examiner

FIG. 4

LEGITIMATE COMMUNICATION TABLE 201

| ID-1 | COMMUNICATION SOURCE DEVICE | TRANSMISSION DESTINATION DEVICE |
|---|---|---|
| 1 | DEVICE 10A | DEVICE 12B |
| 2 | DEVICE 12A | DEVICE 10B |
| 3 | DEVICE 10B | DEVICE 12B |
| 4 | DEVICE 12B | DEVICE 13A |
| 5 | DEVICE 12B | DEVICE 13B |
| ⋮ | ⋮ | ⋮ |
| 301 | 302 | 303 |

FIG. 5

LEGITIMATE SERVICE TABLE 202

| ID-2 | SERVICE IDENTIFIER | SERVER DEVICE | CLIENT DEVICE |
|---|---|---|---|
| 1 | 1 | DEVICE 12A | DEVICE 10A |
| 2 | 1 | DEVICE 12B | DEVICE 10B |
| 3 | 2 | DEVICE 10B | DEVICE 12A |
| 4 | 3 | DEVICE 13A | DEVICE 12B |
| 5 | 3 | DEVICE 13B | DEVICE 12B |
| ⋮ | ⋮ | ⋮ | ⋮ |
| 401 | 402 | 403 | 404 |

FIG. 6

BUSINESS SEQUENCE TABLE 203

| ID-3 | ELEMENT NUMBER | LEGITIMATE SERVICE IDENTIFIER LIST (ID-2) | ALLOWABLE TIME (SECONDS) |
|---|---|---|---|
| 1 | 2 | 1,2 | 60 |
| 2 | 3 | 3,4,5 | 120 |
| : | : | : | : |
| 501 | 502 | 503 | 504 |

FIG. 7

ESTABLISHMENT WAIT SEQUENCE TABLE 204

| ID-4 | START TIME | BUSINESS SEQUENCE IDENTIFIER (ID-3) | NEXT ELEMENT No |
|---|---|---|---|
| 1 | 2017-06-28 8:00:00 | 2 | 1 |
| 2 | 2017-06-28 10:00:00 | 1 | 1 |
| : | | : | : |

WAIT PACKET TABLE 205

| ID-5 | ESTABLISHMENT WAIT SEQUENCE IDENTIFIER (ID-4) | OCCURRENCE TIME | COMMUNICATION SOURCE DEVICE | COMMUNICATION DESTINATION DEVICE | SERVICE IDENTIFIER |
|---|---|---|---|---|---|
| 1 | 3 | 2017-06-28 8:00:00 | DEVICE 10B | DEVICE 12B | 2 |
| 2 | 1 | 2017-06-28 10:00:01 | DEVICE 12B | DEVICE 13A | 3 |
| 3 | 2 | 2017-06-28 8:00:00 | DEVICE 10A | DEVICE 12A | 1 |
| ⋮ | ⋮ | ⋮ | ⋮ | ⋮ | |

ILLEGITIMATE COMMUNICATION INFORMATION TABLE 206

| ID-6 | OCCURRENCE TIME | BUSINESS SEQUENCE IDENTIFIER (ID-3) | COMMUNICATION SOURCE DEVICE | COMMUNICATION DESTINATION DEVICE | TYPE |
|---|---|---|---|---|---|
| 1 | 2017-06-28 8:00:50 | 3 | DEVICE 10B | DEVICE 12B | TIMEOUT |
| 2 | 2017-06-28 8:00:01 | 2 | DEVICE 12B | DEVICE 13A | SEQUENCE OMISSION |
| 3 | 2017-06-28 10:00:02 | 1 | DEVICE 12B | DEVICE 10B | SEQUENCE DUPLICATION |
| : | | : | : | : | |

801　802　803　804　805　806

COMMUNICATION MONITORING SYSTEM, COMMUNICATION MONITORING APPARATUS, AND COMMUNICATION MONITORING METHOD

CROSS-REFERENCE TO RELATED APPLICATIONS

This application is a U.S. National Stage entry of PCT Application No: PCT/JP2018/042430 filed Nov. 16, 2018, which claims priority to Japanese Patent Application No. 2017-252939, filed Dec. 28, 2017, the contents of which are incorporated herein by reference.

TECHNICAL FIELD

The present invention relates to a communication monitoring system, a communication monitoring apparatus, a communication monitoring method capable of detecting an abuse using a legitimate communication.

BACKGROUND ART

PTL 1 discloses the following technology as a method for detecting a potential infection of a cyber attack in an industrial network. A system includes hardware and software elements for setting a baseline of site-acceptable network behavior including a list of network states and transition probabilities. The transition probability indicates an estimated probability that a first network state temporarily follows a second network state during a normal network operation. A threshold value indicating the probability is set. When the probability is below than the threshold value, a probability that a sequence of network states obtained from a specific series of packets will occur is specified based on an anomalous sequence of network states and the baseline of the site-acceptable network behavior, and protective measures are executed depending on whether or not the specified probability is below the set threshold value.

CITATION LIST

Patent Literature

PTL 1: JP 2017-41886 A

SUMMARY OF INVENTION

Technical Problem

However, in PTL 1, in a communication protocol used in a business, an abuse (hereinafter, referred to as an abuse using a legitimate communication) when data is transmitted from a legitimate device that executes the business in the same manner as when the business is executed cannot be detected.

The present invention has been made in view of the above circumstances, and an object of the present invention is to provide a communication monitoring system, a communication monitoring apparatus, and a communication monitoring method capable of detecting an abuse using a legitimate communication used for executing a business sequence.

Solution to Problem

In order to achieve the object, a communication monitoring system according to a first aspect includes a business system that performs communication between a transmission source device and a transmission destination device according to a business sequence, and executes a plurality of processes constituting a business defined by the business sequence, and a communication monitoring apparatus that monitors a communication packet used for the communication of the business system. The communication monitoring apparatus determines whether or not the plurality of processes is executed according to the business sequence based on transmission source information and transmission destination information included in the communication packet.

Advantageous Effects of Invention

According to the invention, the abuse using the legitimate communication used for executing the business sequence can be detected.

BRIEF DESCRIPTION OF DRAWINGS

FIG. 4 is a diagram illustrating an example of a legitimate communication table of FIG. 1.

FIG. 5 is a diagram illustrating an example of a legitimate service table of FIG. 1.

FIG. 6 is a diagram illustrating an example of a business sequence table of FIG. 1.

FIG. 7 is a diagram illustrating an example of an establishment wait sequence table of FIG. 1.

FIG. 8 is a diagram illustrating an example of a wait packet table of FIG. 1.

FIG. 9 is a diagram illustrating an example of an illegitimate communication information table.

DESCRIPTION OF EMBODIMENTS

The present invention relates to the Cross-ministerial Strategic Innovation Promotion Program (SIP) "Ensuring Cyber-Security for Critical Infrastructure" of the Council for Science, Technology and Innovation promoted by NEDO.

An embodiment will be described with reference to the drawings. The embodiment to be described below does not limit inventions according to the claims, and all elements and combinations described in the embodiment are not essential for the solution of the invention.

Figure 1:
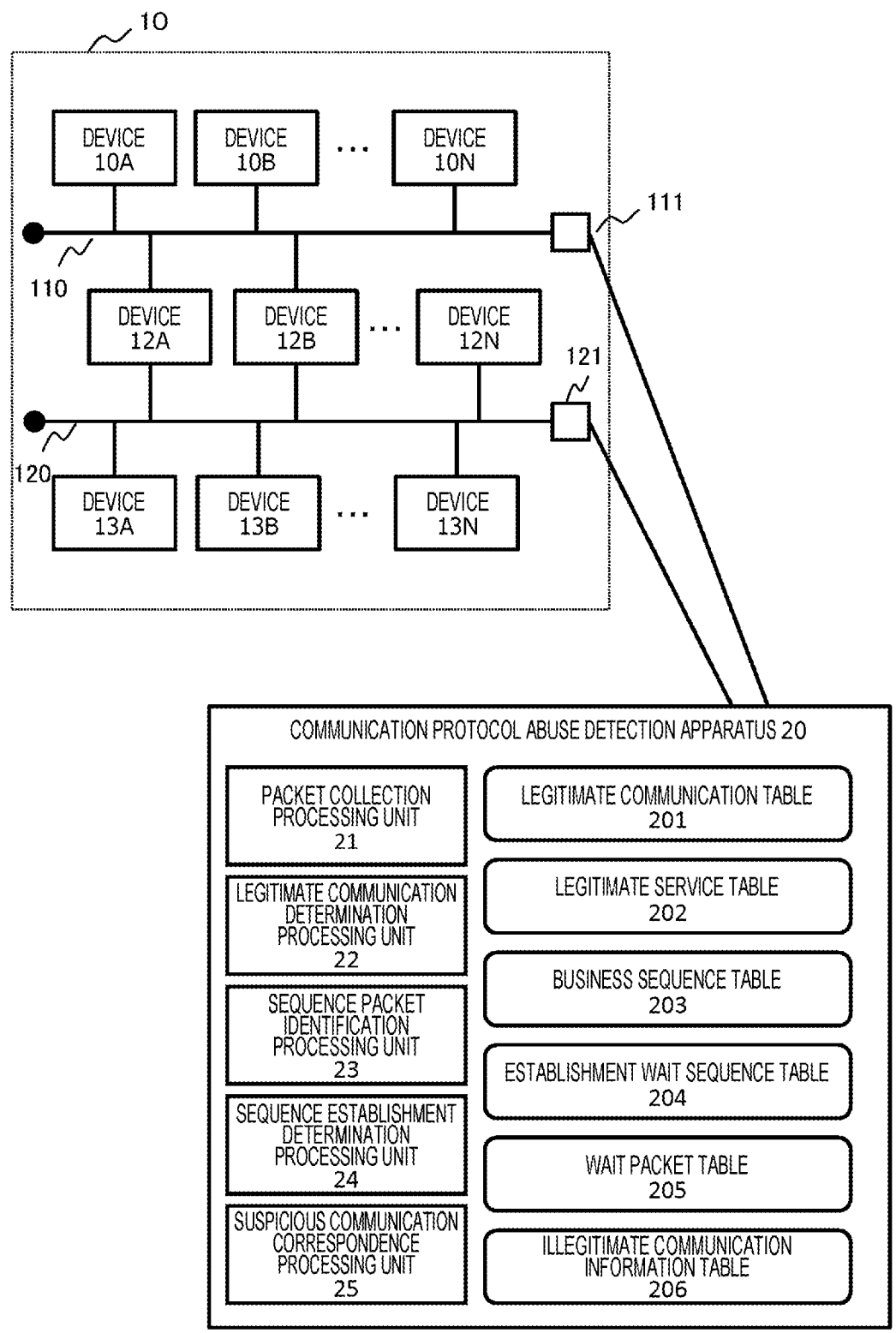
FIG. 1 is a block diagram illustrating a functional configuration of a communication monitoring system according to an embodiment.

FIG. 1 is a block diagram illustrating a functional configuration of a communication monitoring system according to the embodiment. The communication monitoring system can be applied to a business system that executes a business defined by a business sequence. The business defined in the business sequence can execute a plurality of processes. The business system can realize a service constituting the business by executing the plurality of processes constituting the business. The services mentioned herein are services used via a network. For example, a protocol (telnet) for remotely operating a device, a file transfer protocol (FTP), or an operation management service or a control service unique to the business system which is a general-purpose service in an IP network can be assumed.

In the business sequence, after a certain device communicates with another device, devices to communicate with each other are set. The business system executes the plurality of processes constituting the business defined by the business sequence based on communication between these devices. This business system is, for example, an industrial control system (ICS) supporting a social infrastructure or a manufacturing plant.

In FIG. 1, the communication monitoring system includes a monitoring target system 10 and a communication protocol abuse detection apparatus 20. The monitoring target system 10 is the business system. The communication protocol abuse detection apparatus 20 monitors a communication packet used for communication of the monitoring target system 10. The communication protocol abuse detection apparatus determines whether or not the plurality of processes constituting the business specified by the business sequence is executed according to the business sequence based on transmission source information and transmission destination information included in this communication packet.

The monitoring target system 10 includes devices 10A to 10N, 12A to 12N, and 13A to 13N having various functions. The devices 10A to 10N and 12A to 12N are connected via a network 110. The devices 12A to 12N and 13A to 13N are connected via a network 120. A mirror port 111 is connected to the information and control network 110, and a mirror port 121 is connected to the control network 120.

For example, when the monitoring target system 10 is an industrial control system, the network 110 is the information and control network, and the network 120 is the control network. The devices 10A to 10N are a system monitoring server that monitors an operation of the entire system, a server that manages an operation plan of the system, and a maintenance server. The devices 12A to 12N are control servers that transmit control commands to the devices 12A to 12N and 13A to 13N or collect log information according to commands from the system monitoring server. The devices 13A to 13N are programmable controllers (programmable logic controllers: PLCs) that set a rotational speed of a motor according to commands from the control server or collect setting information.

The mirror ports 111 and 112 collect communication packets flowing through the networks 110 and 120 of the monitoring target system 10, and transmit copies of the communication packets to the communication protocol abuse detection apparatus 20.

The communication protocol abuse detection apparatus 20 is connected to the mirror ports 111 and 112. The communication protocol abuse detection apparatus 20 can detect an abuse using legitimate communication by collecting and analyzing the communication packets flowing through the networks 110 and 120 of the monitoring target system 10. Here, the legitimate communication is communication which is performed between the devices 10A to 10N, 12A to 12N, and 13A to 13N permitted by the monitoring target system 10 and is related to the services defined by the business sequence of the monitoring target system 10. The abuse using the legitimate communication means that the services are not executed in an order defined by the business sequence by using the communication which is performed between the devices 10A to 10N, 12A to 12N, and 13A to 13N permitted by the monitoring target system 10 and is related to the services defined in the business sequence of the monitoring target system 10. That is, in the monitoring target system 10, the business sequence is executed by combining a plurality of legitimate communications between the devices 10A to 10N, 12A to 12N, and 13A to 13N. At this time, the combination of the legitimate communications between the devices 10A to 10N, 12A to 12N, and 13A to 13N permitted by the monitoring target system 10 is set to be different from the combination of the legitimate communications used in the business sequence, and thus, the abuse using the legitimate communication can be performed.

The communication protocol abuse detection apparatus 20 includes a packet collection processing unit 21, a legitimate communication determination processing unit 22, a sequence packet identification processing unit 23, a sequence establishment determination processing unit 24, and a suspicious communication correspondence processing unit 25. The communication protocol abuse detection apparatus 20 retains a legitimate communication table 201, a legitimate service table 202, a business sequence table 203, an establishment wait sequence table 204, a wait packet table 205, and an illegitimate communication information table 206.

The packet collection processing unit 21 collects and analyzes the communication packets flowing through the networks 110 and 120 of the monitoring target system 10 via the mirror ports 111 and 121, and extracts meta information from the communication packet. The meta information is, for example, IP addresses of a communication source device and a communication destination device, a communication protocol, and transmission destination port numbers for identifying the services to be used.

The legitimate communication determination processing unit 22 determines whether or not the communication packet received by the communication destination device is a legitimate communication packet permitted by the monitoring target system 10 based on the meta information extracted by the packet collection processing unit 21. When the communication packet received by the communication destination device is the legitimate communication packet, the legitimate packet is processed by the sequence packet identification processing unit 23. When the communication packet received by the communication destination device is not the legitimate communication packet, since the communication is the illegitimate communication, the suspicious communication correspondence processing unit 25 executes a countermeasure process such as outputting an alert.

The sequence packet identification processing unit 23 determines whether or not the communication packet determined to be the legitimate communication packet by the legitimate communication determination processing unit 22 is the communication packet constituting the business sequence. When it is determined that the communication packet is the communication packet constituting the business sequence, the communication packet is processed by the sequence establishment determination processing unit 24.

The sequence establishment determination processing unit 24 determines whether or not the business sequence related to the communication packet determined to constitute the business sequence by the sequence packet identification processing unit 23 is established. At this time, it is possible to determine that the business sequence is established when the plurality of processes constituting the business defined by the business sequence is executed within an allowable time in the order defined by the business sequence.

Meanwhile, it is possible to determine that the business sequence is not established when the plurality of processes constituting the business defined by the business sequence is not executed in the order defined by the business sequence. Alternatively, it is possible to determine that the business sequence is not established when the plurality of processes constituting the business defined by the business sequence is not executed within the allowable time defined by the business sequence.

When the business sequence is established, the communication packet constituting the business sequence is determined to be a normal legitimate communication. When the business sequence is not established, it is determined that the communication packet constituting the business sequence is the abuse using the legitimate communication.

The suspicious communication correspondence processing unit 25 performs the countermeasure process such as outputting an alert when the illegitimate communication is detected or the abuse using the legitimate communication is detected.

The legitimate communication table 201 registers a set of the transmission source device and the transmission destination device that are permitted in the communication of the monitoring target system 10. The transmission source device and the transmission destination device are selected from the devices 10A to 10N, 12A to 12N, and 13A to 13N.

The legitimate service table 202 stores information on services that are permitted to be used by the monitoring target system 10. As the information on the services, a client device and a server device used for a process for realizing the services constituting the business of the monitoring target system 10 can be set as a set.

The business sequence table 203 stores information on a communication sequence for a business performed by the monitoring target system 10. As the information on the communication sequence, it is possible to set the order of the services constituting the business of the monitoring target system 10 and the allowable time for executing the business.

The establishment wait sequence table 204 stores information on the business sequence being executed. At this time, the establishment wait sequence table 204 can retain a next element of the business sequence being executed. The next element can indicate a service to be executed next in the business sequence.

The wait packet table 205 stores information on communication packet constituting an establishment wait sequence. At this time, the wait packet table 205 can indicate the set of the transmission source device and the transmission destination device specified by the communication packet in a wait state which is used for the business sequence designated by the establishment wait sequence table 204.

The illegitimate communication information table 206 stores information on the communication determined to be the abuse using the legitimate communication. At this time, the illegitimate communication information table 206 can indicate the set of the transmission source device and the transmission destination device used for the abuse using the legitimate communication.

The legitimate communication determination processing unit 22 determines whether or not these communication packet is the legitimate communication packet based on a collation result of the transmission source information and the transmission destination information included in the communication packet used for the communication of the monitoring target system 10 with the transmission source device and the transmission destination device registered in the legitimate communication table 201.

The sequence packet identification processing unit 23 identifies whether or not the communication packet is the communication packet constituting the business sequence of the monitoring target system 10 based on a collation result of the transmission source information and the transmission destination information included in the legitimate communication packet with the client device and the server device related to the services registered in the legitimate service table 202.

When the first communication packet constituting the business sequence of the monitoring target system 10 is received, the sequence establishment determination processing unit 24 generates the establishment wait sequence table 204 indicating an execution state of the business sequence. The sequence establishment determination processing unit 24 stores the wait packet table 205 in which the transmission source device and the transmission destination device designated by the communication packet in the wait state which are used for the business sequence specified in the establishment wait sequence table 204 are registered as the set. The sequence establishment determination processing unit 24 determines whether or not the communication packet constituting the business sequence is the communication packet in the wait state by referring to the wait packet table 205 based on the transmission source information and the transmission destination information included in the communication packet constituting the business sequence. The sequence establishment determination processing unit 24 determines whether or not the plurality of processes constituting the business defined by the business sequence table 203 is executed in the order defined by the business sequence table 203 based on a determination result as to whether or not the communication packet constituting the business sequence is the communication packet in the wait state.

At this time, when the plurality of processes constituting the business defined by the business sequence table 203 is not executed in the order defined by the business sequence table 203, it is possible to determine that the business sequence is not established, and it is possible to determine that the abuse using the legitimate communication used for executing the business sequence occurs. Thus, even when the legitimate communication used for executing the business sequence is abused, it is possible to detect the abuse using the legitimate communication.

Figure 2:
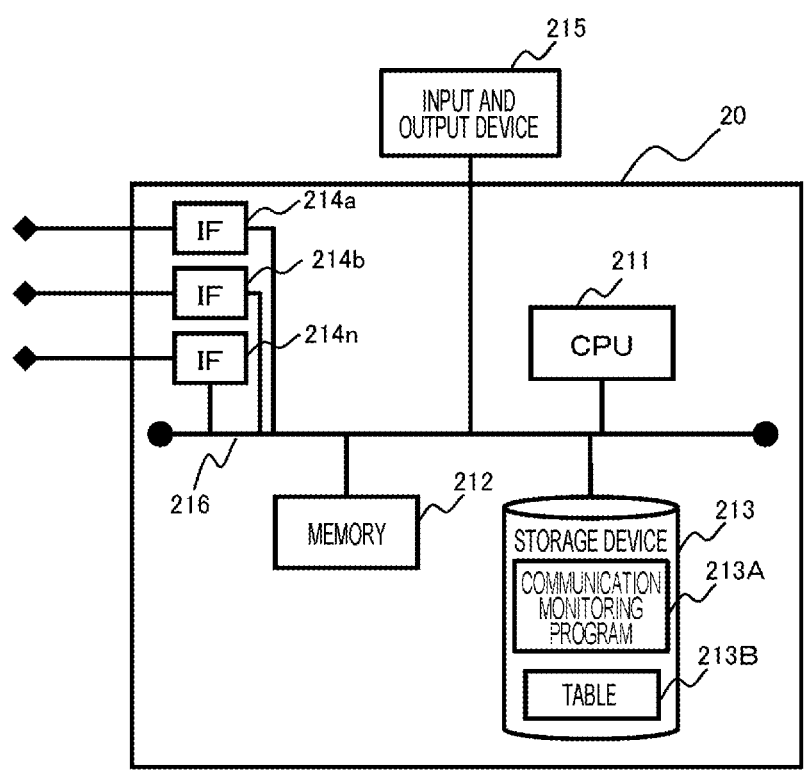
FIG. 2 is a block diagram illustrating a hardware configuration of a communication protocol abuse detection apparatus of FIG. 1.

FIG. 2 is a block diagram illustrating a hardware configuration of the communication protocol abuse detection apparatus of FIG. 1.

In FIG. 2, the communication protocol abuse detection apparatus 20 includes a central processing unit (CPU) 211, a memory 212, a storage device 213, an interface 214, an input and output device 215, and a bus 216.

The CPU 211 controls an overall operation of the communication protocol abuse detection apparatus 20 by executing various programs stored in the memory 212.

The memory 212 stores various programs being executed by the CPU 211 or provides a work area used by the CPU 211 during the execution of the program.

The storage device 213 is a storage medium such as a hard disk or a flash memory. The storage device 213 stores a communication monitoring program 213A and a table 213B.

IFs 214a, 214b, 214n connect the communication protocol abuse detection apparatus 20 to the networks 110 and 120 of the monitoring target system 10. The communication packets of the monitoring target system 10 including the plurality of networks 110 and 120 can be collected by providing the plurality of IFs 214a, 214b, and 214n.

The input and output device 215 is a keyboard and a mouse for the user to input various information, and a display for outputting information to a user.

The bus 216 connects the CPU 211, the memory 212, the storage device 213, the IFs 214a, 214b, and 214n, and the input and output device 215 such that these components can communicate with each other.

The table 213B can store the legitimate communication table 201, the legitimate service table 202, and the business sequence table 203 of FIG. 1. The CPU 211 can realizes functions of the packet collection processing unit 21, the legitimate communication determination processing unit 22, the sequence packet identification processing unit 23, the sequence establishment determination processing unit 24, and the suspicious communication correspondence processing unit 25 by reading the communication monitoring program 213A and the table 213B into the memory 212 and executing the communication monitoring program 213A while referring to the table 213B.

Figure 3:
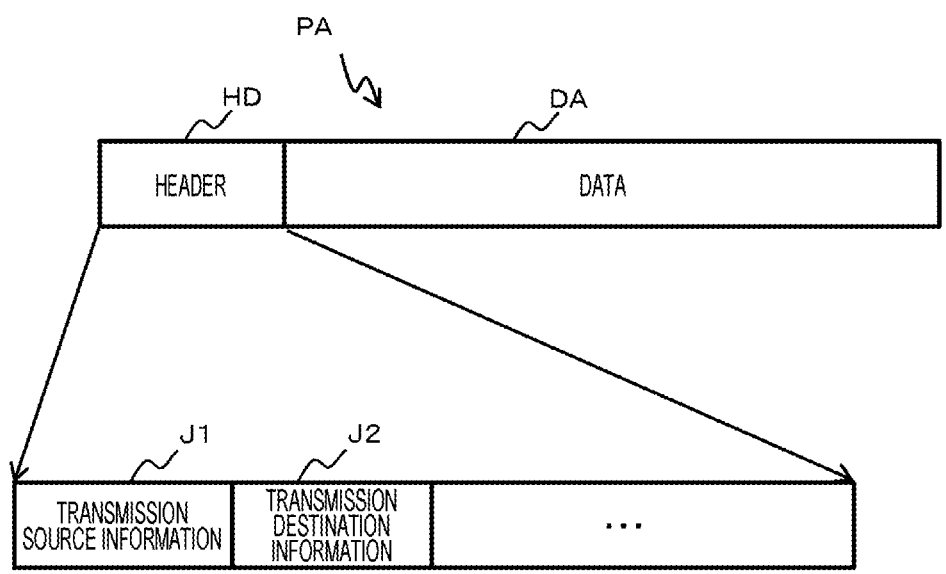
FIG. 3 is a diagram illustrating a configuration of a communication packet used for communication of the communication monitoring system of FIG. 1.

FIG. 3 is a diagram illustrating a configuration of the communication packet used for the communication of the communication monitoring system of FIG. 1.

In FIG. 3, a data DA is set in a communication packet PA, and a header HD is added to the data DA. Transmission source information J1 and transmission destination information J2 are set in the header HD. The IP address of the transmission source device can be used as the transmission source information J1, and the IP address of the transmission destination device or the transmission destination port number can be used as the destination information J2.

At this time, the IP address of the transmission source device can be used for specifying the client device that uses the service provided in the business sequence, the IP address of the transmission destination device can be used for specifying the server device that provides the service to the client device, and the transmission destination port number can be used for specifying a service identifier for identifying the service to be used.

FIG. 4 is a diagram illustrating an example of the legitimate communication table of FIG. 1.

In FIG. 4, the legitimate communication table 201 stores a set of the communication source device and the communication destination device and an identifier ID-1 for uniquely specifying the set for the communication permitted by the monitoring target system 10. The identifier ID-1 can be stored in a column 301, the communication source device can be stored in a column 302, and the communication destination device can be stored in a column 303. For example, the IP addresses of the devices 10A to 10N, 12A to 12N, and 13A to 13N selected as the communication source and the communication destination can be stored as the communication source device and the communication destination device.

FIG. 5 is a diagram illustrating an example of the legitimate service table of FIG. 1.

In FIG. 5, the legitimate service table 202 includes, for the service permitted to be used by the monitoring target system 10, the server device that provides the service, the client device that uses the service, the service identifier that specifies the service, and a legitimate service identifier ID-2 that uniquely specifies the set of the server device and the client device corresponding to this service. The set of the server device and the client device specified by the legitimate service identifier ID-2 is selected from the set of the communication source device and the communication destination device stored in the legitimate communication table 201 of FIG. 4. At this time, the legitimate communication can be realized by the communication between the server device and the client device specified by the legitimate service identifier ID-2. The legitimate service identifier ID-2 can be stored in a column 401, the service identifier can be stored in a column 402, the server device can be stored in a column 403, and the client device can be stored in a column 404.

FIG. 6 is a diagram illustrating an example of the business sequence table of FIG. 1.

In FIG. 6, the business sequence table 203 stores the communication sequence for the business performed by the monitoring target system 10. Specifically, the business sequence table 203 includes a business sequence identifier ID-3 that uniquely specifies the business sequence, the number of elements (element number) constituting the business sequence, a legitimate service identifier list that specifies the services constituting the business sequence, and an allowable time from the start of the business sequence to the completion thereof. In the legitimate service identifier list, the legitimate service identifiers ID-2 are listed in the order of execution of the services constituting the business sequence. The element number is the number of services constituting the business sequence. The business sequence identifier ID-3 can be stored in a column 501, the element number can be stored in a column 502, the legitimate service identifier list can be stored in a column 503, and the allowable time can be stored in a column 504.

FIG. 7 is a diagram illustrating an example of the establishment wait sequence table of FIG. 1.

In FIG. 7, the establishment wait sequence table 204 manages a progress state of the business sequence to which the communication packet determined to constitute the business sequence by the sequence packet identification processing unit 23 belong.

Specifically, the establishment wait sequence table 204 stores an establishment wait sequence identifier ID-4 that uniquely specifies an establishment wait business sequence, a start time of the business sequence being waited for establishment, a business sequence identifier ID-3 that specifies the business sequence being waited for the establishment, and a number (next element No) of a next execution element of the business sequence. The establishment wait sequence identifier ID-4 can be stored in a column 601, the start time can be stored in a column 602, the business sequence identifier ID-3 can be stored in a column 603, and the next element No can be stored in a column 604.

FIG. 8 is a diagram illustrating an example of the wait packet table of FIG. 1.

In FIG. 8, the wait packet table 205 stores information on the communication packet belonging to the establishment wait sequence being determined for the establishment of the business sequence. Specifically, the wait packet table 205 stores an identifier ID-5 that uniquely specifies await packet, an establishment wait sequence identifier ID-4 that specifies the establishment wait business sequence to which this packet belongs, an occurrence time of the communication packet, the communication source device, the communication destination device, and the service identifier. The identifier ID-5 can be stored in a column 701, the establishment wait sequence identifier ID-4 can be stored in a column 702, the occurrence time can be stored in a column 703, the communication source device can be stored in a column 704, the communication destination device can be stored in a column 705, and the service identifier can be stored in a column 706.

FIG. 9 is a diagram illustrating an example of the illegitimate communication information table.

In FIG. 9, the illegitimate communication information table 206 stores information on the illegitimate communication determined to be the abuse using the legitimate communication by the sequence establishment determination processing unit 24. Specifically, the illegitimate communication information table 206 stores an identifier ID-6 that uniquely identifies the illegitimate communication, an occurrence time of the illegitimate communication, a business sequence identifier ID-3 that specifies a sequence to which the illegitimate communication belongs, the communication source device used for the illegitimate communication, the communication destination device used for the illegitimate communication, and a determination type. The identifier ID-6 can be stored in a column 801; the occurrence time can be stored in a column 802, the business sequence identifier ID-3 can be stored in a column 803, the communication source device can be stored in a column 804, the communication destination device can be stored in a column 805, and the determination type can be stored in a column 806.

Hereinafter, the abuse using the legitimate communication will be described in detail by using an example of a business sequence SK2 to which 2 is assigned as the business sequence identifier ID-3 stored in the business sequence table 203 of FIG. 6.

Figure 10:
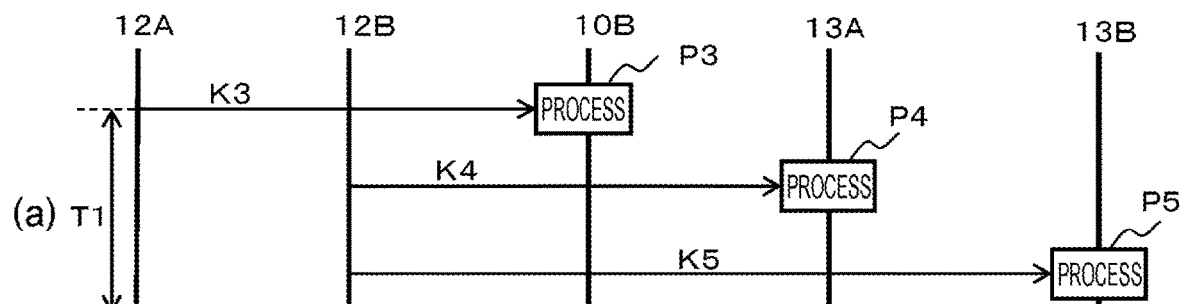
FIG. 10(*a*) is a diagram illustrating an example of a legitimate communication method according to a business sequence executed by the communication monitoring system of FIG. 1, FIG. 10(*b*) is a diagram illustrating an example of an abuse using a legitimate communication used for executing the business sequence of FIG. 10(*a*), and FIG. 10(*c*) is a diagram illustrating another example of the abuse using the legitimate communication used for executing the business sequence of FIG. 10(*a*).
Figure 10:
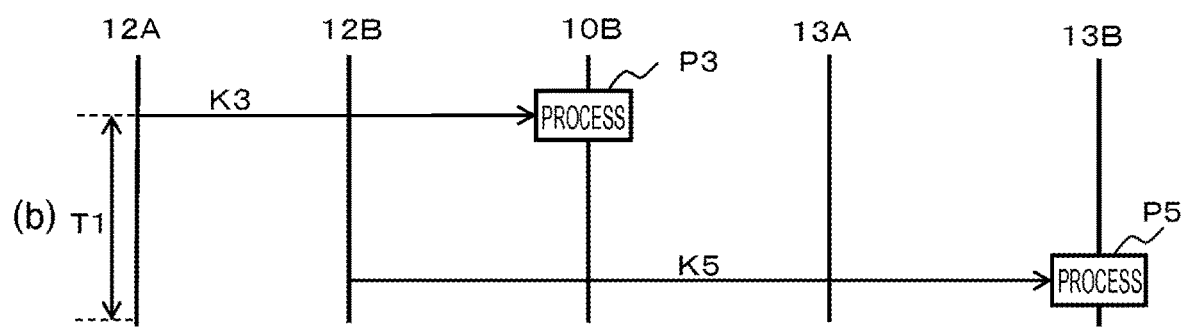
Figure 10:
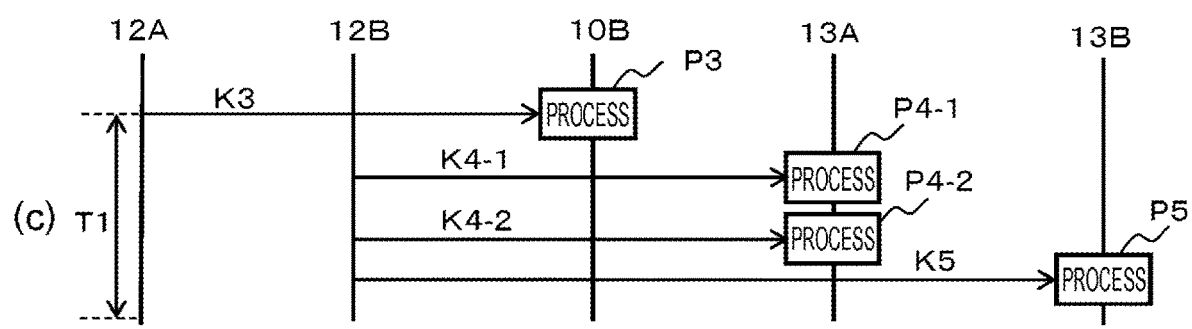

FIG. 10(*a*) is a diagram illustrating an example of a legitimate communication method according to the business sequence executed by the communication monitoring system of FIG. 1, FIG. 10(*b*) is a diagram illustrating the abuse using the legitimate communication used for executing the business sequence of FIG. 10(*a*), and FIG. 10(*c*) is a diagram illustrating another example of the abuse using the legitimate communication used for executing the business sequence of FIG. 10(*a*).

In the business sequence table 203 of FIG. 6, the legitimate service identifiers ID-2 of 3, 4, and 5 are stored in order in the legitimate service identifier list when the business sequence identifier ID-3 is 2.

As illustrated in FIG. 5, for the service specified by the legitimate service identifier ID-2 of 3, the device 12A is used as the client device, and the device 10B is used as the server device. At this time, as illustrated in FIG. 10(*a*), a legitimate communication K3 is performed between the device 12A and the device 10B. The device 10B executes a process P3 corresponding to the service specified by the legitimate service identifier ID-2 of 3 based on the legitimate communication K3.

As illustrated in FIG. 5, for the service specified by the legitimate service identifier ID-2 of 4, the device 12B is used as the client device, and the device 13A is used as the server device. At this time, as illustrated in FIG. 10(*a*), a legitimate communication K4 is performed between the device 12B and the device 13A. The device 13A executes a process P4 corresponding to the service specified by the legitimate service identifier ID-2 of 4 based on the legitimate communication K4.

As illustrated in FIG. 5, for the service specified by the legitimate service identifier ID-2 of 5, the device 12B is used as the client device, and the device 13B is used as the server device. At this time, as illustrated in FIG. 10(*a*), a legitimate communication K5 is performed between the device 12B and the device 13B. The device 13B executes a process P5 corresponding to the service specified by the legitimate service identifier ID-2 of 5 based on the legitimate communication K5.

Here, it is assumed that T1 is set as the allowable time in the business sequence table 203. The processes P3, P4, and P5 are executed within the allowable time T1 based on these legitimate communications K3, K4, and K5, and thus, the business sequence SK2 registered in the business sequence table 203 is realized. Here, when the processes P3, P4, and P5 executed based on the legitimate communication K3, K4, and K5 exceeds the allowable time T1, it is possible to determine that the business sequence SK2 is not established, and it is possible to determine that the abuse using the legitimate communication K3, K4, and K5 occurs.

As illustrated in FIG. 10(*b*), it is assumed that after the process P3 is executed based on the legitimate communication K3, the process P5 is executed based on the legitimate communication K5. In this case, the process P4 executed based on the legitimate communication K4 is omitted. Thus, in the business sequence table 203 of FIG. 6, the services specified by the legitimate service identifiers ID-2 of 3, 4, and 5 registered in the legitimate service identifier list when the business sequence identifier ID-3 is 2 are not executed in this order. Thus, it is possible to determine that the business sequence SK2 is not established, and it is possible to determine that the abuse using the legitimate communications K3 and K5 occurs.

Here, when the communication packet used for the first process P3 constituting the business sequence SK2 is received, information indicating an execution state of the business sequence SK2 is registered in the establishment wait sequence table 204 as illustrated in FIG. 7. The business sequence SK2 is assigned 2 as the business sequence identifier ID-3. Thus, the business sequence identifier ID-3 of 2 is registered in the column 603 of the establishment wait sequence table 204, and the establishment wait sequence identifier ID-4 of 1 which uniquely specifies the business sequence SK2 registered at that time is assigned.

As illustrated in FIG. 8, information used for the process P4 executed after the first process P3 constituting the business sequence SK2 is registered in the wait packet table 205. The business sequence SK2 is assigned 2 as the business sequence identifier ID-3. As illustrated in FIG. 7, in the establishment wait sequence table 204, the establishment wait sequence identifier ID-4 of 1 is assigned to the business sequence identifier ID-3 of 2. Therefore, 1 as the wait sequence identifier ID-4 is registered in the wait packet table 205, and the identifier ID-5 of 2 that uniquely specifies the business sequence SK2 being waited for completion is assigned. In the process P4, the legitimate communication K4 is used. Therefore, in the wait packet table 205, the device 12B is registered as the communication source device used for the legitimate communication K4, and the device 13A is registered as the communication destination device used for the legitimate communication K4.

The sequence establishment determination processing unit 24 of FIG. 1 can collate the transmission source information J1 extracted from the header HD of the communication packet used for the legitimate communication K4 with the IP address allocated to the device 12B registered in the wait packet table 205, and can collate the transmission destination information J2 extracted from the header HD of the communication packet used for the legitimate communication K4 with the IP address allocated to the device 13A registered in the wait packet table 205. When the transmission source information J1 extracted from the header HD of the communication packet used for the legitimate communication K4 does not match the IP address allocated to the device 12B registered in the wait packet table 205 or the transmission destination information J2 extracted from the header HD of the communication packet used for the legitimate communication K4 does not match the IP address allocated to the device 13A registered in the wait packet table 205, the sequence establishment determination processing unit 24 can determine that the process P4 based on the legitimate communication K4 of FIG. 10(*b*) is omitted. When the process P4 based on the legitimate communication K4 is omitted, the sequence establishment determination processing unit 24 can determine that the business sequence SK2 is not established, and can determine that the abuse using the legitimate communications K3 and K5 occurs.

As illustrated in FIG. 10(*c*), it is assumed that after the process P3 is executed based on the legitimate communication K3, a process P4-1 is executed based on a legitimate communication K4-1, a process P4-2 is further executed based on a legitimate communication K4-2, and then the process P5 is executed based on the legitimate communication K5. In this case, in the business sequence table 203 of FIG. 6, the services specified by the legitimate service identifiers ID-2 of 3, 4, and 5 registered in the legitimate service identifier list when the business sequence identifier ID-3 is 2 are not executed in this order. Thus, it is possible to determine that the business sequence SK2 is not established, and it is possible to determine that the abuse using the legitimate communications K3, K4-1, K4-2, and K5 occurs.

Figure 11:
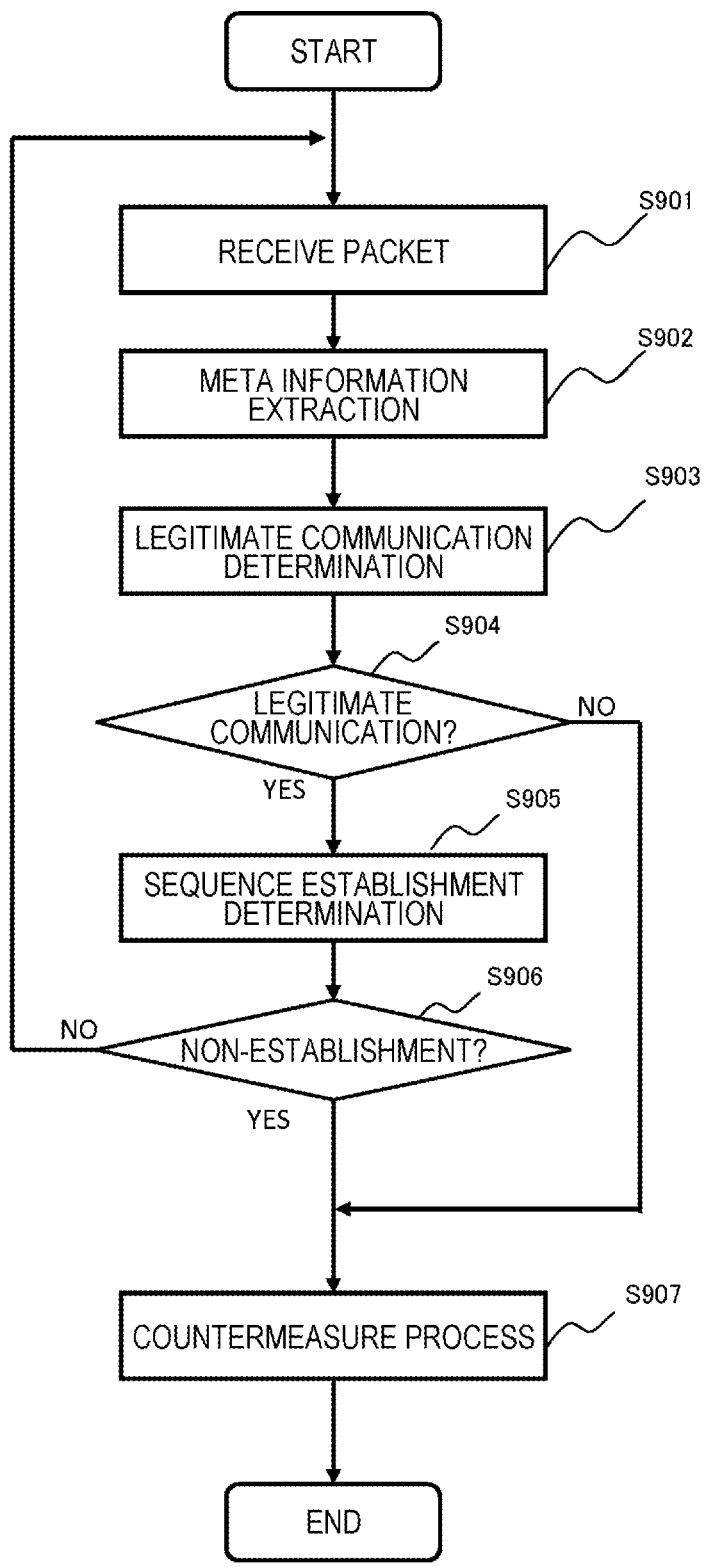
FIG. 11 is a flowchart illustrating a determination process of the abuse using the legitimate communication.

FIG. 11 is a flowchart illustrating an abuse determination process using the legitimate communication.

In FIG. 11, the packet collection processing unit 21 receives the communication packets flowing through the networks 110 and 120 of the monitoring target system 10 via the IFs 214*a*, 214*b*, and 214*n* (S901). The packet collection processing unit 21 extracts, from the communication packet, meta information used in the determination process of the legitimate communication determination processing unit 22, and delivers the meta information to the legitimate communication determination processing unit 22 (S902).

Subsequently, the legitimate communication determination processing unit 22 refers to the legitimate communication table 201 based on the IP address of the communication source device and the communication destination device of the meta information extracted by the packet collection processing unit 21, and confirms whether or not a set of the IP addresses of the communication is stored in the legitimate communication table 201 (S903).

At this time, when the set of the IP addresses of the communication is stored in the legitimate communication table 201 and the set of the IP addresses are used for using the service permitted to be used, it is determined that the communication is the legitimate communication (S904: YES), and the process proceeds to the sequence establishment determination processing unit 24. When such a condition is not satisfied, it is determined that the communication is a suspicious communication (S904: NO), and the processing proceeds to the suspicious communication correspondence processing unit 25.

Here, the IP address of the communication source device, the IP address of the communication destination device, and the transmission destination port number for identifying the service to be used can be set as the meta information of the legitimate communication packet. The sequence packet identification processing unit 23 can determine the service permitted to be used by referring to the legitimate service table 202 based on the meta information of the legitimate communication packet. At this time, the transmission destination port number for identifying the service to be used can correspond to the service identifier, the IP address of the communication destination device can correspond to the server device, and the IP address of the communication source device can correspond to the client device. When a set of these pieces of information is stored in the legitimate service table 202 in the meta information of the legitimate communication packet, it is possible to determine that the permitted service is used.

Subsequently, the sequence establishment determination processing unit 24 determines whether or not the sequence is established or is not established by determining whether or not the business sequence is normally executed based on the communication packet determined to be the legitimate communication (S905). The non-establishment of the sequence means that the communication packet to be included in the sequence is omitted in the middle of the sequence, a generation order of the communication packets is changed, or the communication packet are duplicated.

When the sequence is not established (S906: YES). the sequence establishment determination processing unit 24 determines that the abuse using the legitimate communication occurs, and the process proceeds to the suspicious communication correspondence processing unit 25. When the sequence is not established (S906: NO). the process returns to a packet reception process (S901). and waits for the next communication packet.

When the sequence establishment determination processing unit 24 determines that the abuse using the legitimate communication occurs, the suspicious communication correspondence processing unit 25 performs a countermeasure process when the abuse using the illegitimate communication or the abuse using the legitimate communication is detected (S907). The IP address of the device which is extracted from the meta information of the communication packet used for the abuse using the illegitimate communication or the legitimate communication and is used for the abuse using the illegitimate communication or the legitimate communication, or a determination reason of the abuse using the illegitimate communication or the legitimate communication is output as an alert.

Figure 12:
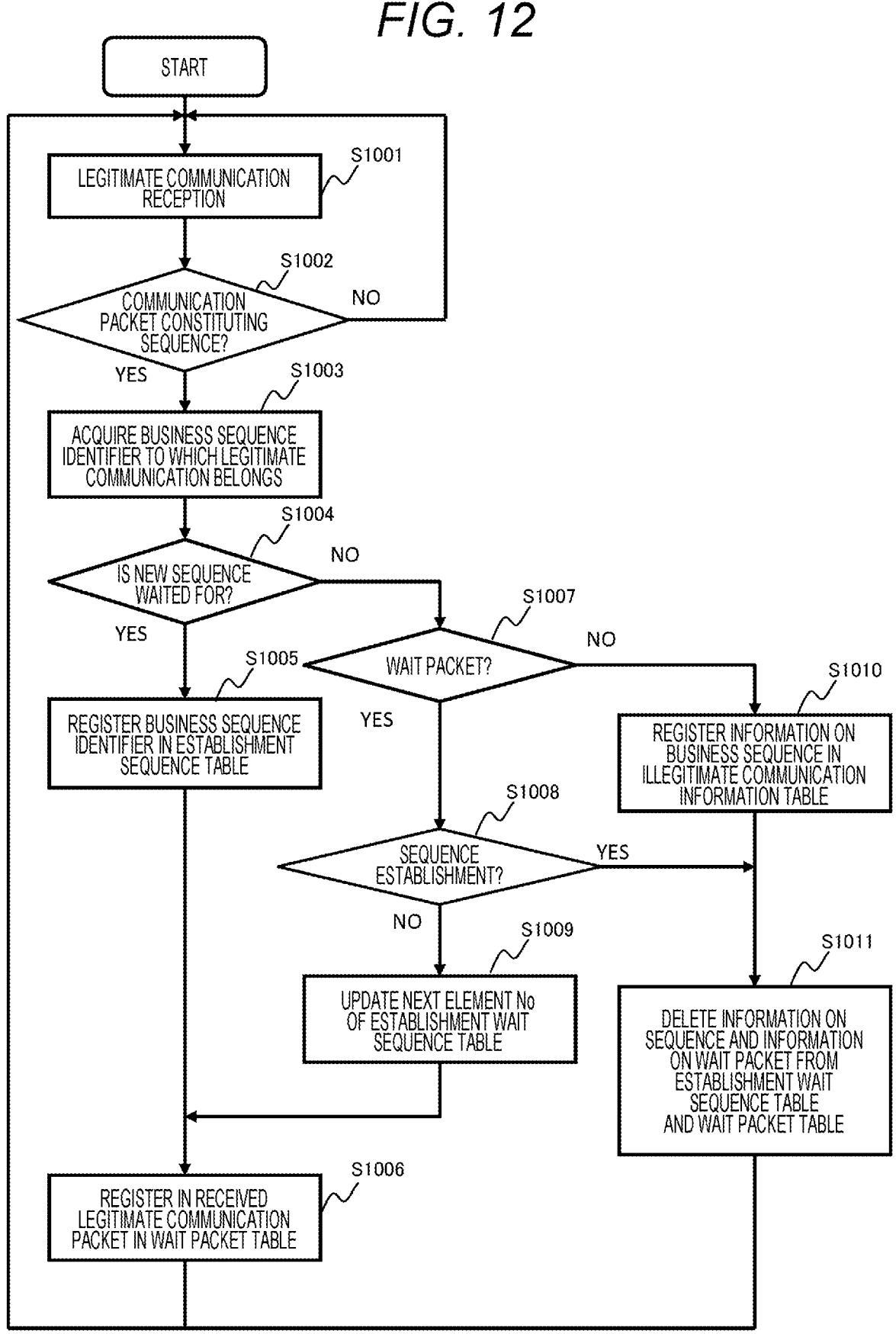
FIG. 12 is a flowchart illustrating a sequence establishment determination process.

FIG. 12 is a flowchart illustrating a sequence establishment determination process.

In FIG. 12, the sequence packet identification processing unit 23 specifies the client device based on the IP address of the transmission source device of the legitimate communication packet, and specifies the server device based on the IP address of the transmission destination device of the legitimate communication packet. The sequence packet identification processing unit 22 specifies the service identifier for identifying the service to be used based on the transmission destination port number of the legitimate communication packet.

The sequence packet identification processing unit 23 specifies the legitimate service identifier ID-2 by referring to the legitimate service table 202 based on the client device, the server device, and the service identifier. The sequence packet identification processing unit 22 refers to the business sequence table 203 based on the legitimate service identifier ID-2, and confirms whether or not the legitimate service identifier ID-2 is included in the legitimate service ID list in the column 503 of the business sequence table 203 (S1001).

When the legitimate service identifier ID-2 is included in the legitimate service ID list, the sequence packet identification processing unit 23 determines that the communication is the communication packet constituting the business sequence (S1002: YES). When the legitimate service identifier ID-2 is not included in the legitimate service ID list, it is determined that the communication is not the communication packet constituting the business sequence (S1002: NO), and the processing returns to S1001.

Subsequently, in the case of the communication packet constituting the business sequence, the sequence establishment determination processing unit 24 acquires, from the business sequence table 203, the business sequence identifier ID-3 that specifies which business sequence the legitimate service identifier ID-2 corresponds to (S1003). For example, in FIG. 6, when the legitimate service identifier ID-2 is 1, the business sequence identifier ID-3 is 1, and when the legitimate service identifier ID-2 is 3, the business sequence identifier ID-3 is 2.

Subsequently, the sequence establishment determination processing unit 24 confirms whether or not the business sequence identifier ID-3 is registered in the establishment wait sequence table 204. When the business sequence identifier ID-3 is not registered in the establishment wait sequence table 204, a new sequence is waited for (S1004: YES), and sequence wait information (the start time, the business sequence identifier ID-3, and the next element No) is stored in the establishment wait sequence table 204, and the establishment wait sequence identifier ID-4 is assigned to this sequence wait information (S1005). The sequence establishment determination processing unit 24 stores the information on the communication packet of the legitimate communication (the establishment wait sequence identifier ID-4, the occurrence time of the communication packet, the communication source device, the communication destination device, and the service identifier) in the wait packet table 205 (S1006).

Meanwhile, when the new sequence is not waited for (S1004: NO), the sequence establishment determination processing unit 24 confirms whether or not the communication packet is being waited for in the establishment wait sequence table 204. In the establishment wait sequence table 204, the business sequence identifier ID-3 and the next element No of the business sequence being waited for are stored. The sequence establishment determination processing unit 24 acquires the legitimate service identifier ID-2 for specifying the communication packet being waited for from the business sequence table 203 based on the business sequence identifier ID-3 and the next element No.

The sequence establishment determination processing unit 24 refers to the legitimate service table 202 based on the legitimate service identifier ID-2, and specifies a wait communication packet. When it is determined that the communication packet is the wait communication packet (S1007: YES), the element number related to the business sequence identifier ID-3 of the business sequence table 203 and the next element No related to the business sequence identifier ID-3 of the establishment wait sequence table 204 are compared, and when there is no next wait element, it is determined that the sequence is established (S1008: YES).

The sequence establishment determination processing unit 24 deletes the information on the established business sequence from the establishment wait sequence table 204, and deletes the information on the communication packet related to the business sequence from the wait packet table 205 (S1011).

Meanwhile, when there is the next wait element, it is determined that the establishment of the business sequence is being waited for (S1008: NO). The sequence establishment determination processing unit 24 updates the establishment wait sequence table 204, and advances the next element No related to the business sequence identifier in the middle of waiting for the establishment of the business sequence by one (S1009).

Meanwhile, when the communication packet is not the wait communication packet (S1007: NO), since the business sequence is not established, it is determined that the abuse using the legitimate communication occurs, and the information (the occurrence time of the illegitimate communication, the business sequence identifier ID 3, the communication source device, the communication destination device, and the determination type) on the business sequence is registered in the illegitimate communication information table 206 (S1010). Information on the unestablished business sequence is deleted from the establishment wait sequence table 204, and information on the communication packet related to the business sequence is deleted from the wait packet table 205 (S1011).

Figure 13:
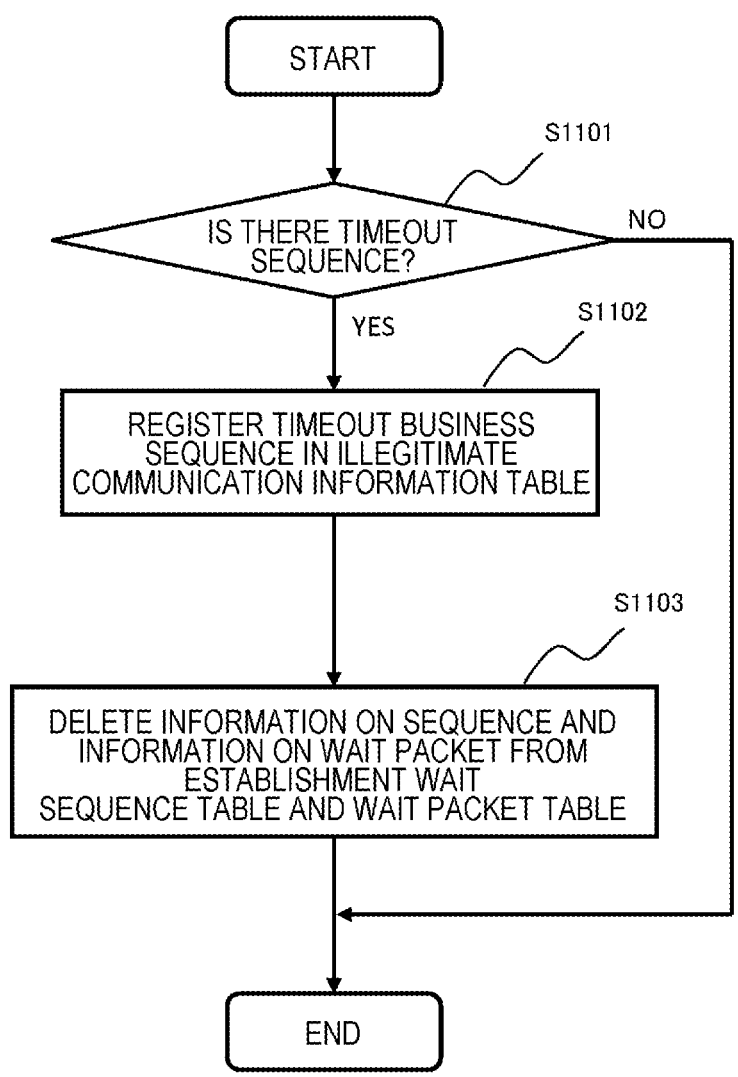
FIG. 13 is a flowchart illustrating a sequence timeout determination process.

FIG. 13 is a flowchart illustrating sequence timeout determination processing. This process is performed in the sequence establishment determination processing unit 23 at a predetermined cycle (for example, every one second).

In FIG. 13, the start time of the business sequence registered in the establishment wait sequence table 204 is compared with the current time. When a time elapsed from the start time of the business sequence exceeds the allowable time allowed for the business sequence, it is determined that a timeout occurs (S1101: YES). This allowable time is the allowable time set in the column 504 of the business sequence table 203 of FIG. 5. When the elapsed time does not exceed the allowable time allowed for the business sequence (S1101: NO), the processing ends.

The sequence establishment determination processing unit 23 determines that the timeout business sequence is abused using the legitimate communication, and registers the timeout business sequence in the illegitimate communication information table 206 (S1102). Information on the non-establishment business sequence is deleted from the establishment wait sequence table 204, and information on the communication packet related to the business sequence is deleted from the wait packet table 205 (S1103).

As described above, the communication protocol abuse detection apparatus 20 can determine whether or not the service using the legitimate communication is executed as defined in the business sequence, and can detect whether or not the service using the legitimate communication used for executing the business sequence.

REFERENCE SIGNS LIST 1 monitoring target system
2 communication protocol abuse detection apparatus
201 packet collection processing unit
22 legitimate communication determination processing unit
23 sequence packet identification processing unit
24 sequence establishment determination processing unit 25 suspicious communication correspondence processing unit
201 legitimate communication table
202 legitimate service table
203 business sequence table
204 establishment wait sequence table
205 wait packet table
206 illegitimate communication information table
211 CPU
212 memory
213 storage device
214 interface
215 input and output device
216 bus

The invention claimed is:

1. A communication monitoring method comprising:
monitoring a communication packet used for a business sequence; and
determining, by a processor, whether or not a plurality of processes constituting a business defined by the business sequence is executed according to the business sequence based on transmission source information and transmission destination information included in the communication packet;
generating an establishment wait sequence table indicating an execution state of the business sequence when a communication packet used in a first process constituting the business sequence is received;
generating a wait packet table that registers, as a set, a transmission source device and a transmission destination device designated by the communication packet in a wait state which is used for the business sequence specified by the establishment wait sequence table; and
determining whether or not the plurality of processes constituting the business defined by a business sequence table, which registers an order of the processes constituting the business, is executed according to an order defined by the business sequence table based on a determination result of whether or not the communication packet is the communication packet in the wait state.

2. The communication monitoring method according to claim 1, further comprising:
determining that the business sequence is established when the processes are executed according to an order defined by the business sequence;
determining that the business sequence is not established when the process is not executed according to the order defined by the business sequence; and
determining that an abuse using a legitimate communication between the transmission source device and the transmission destination device occurs when the business sequence is not established.

3. The communication monitoring method according to claim 2, further comprising:
registering a set of the transmission source device and a transmission destination device used for communication of a business system in a legitimate communication table;
registers a set of a client device and a server device used in the process constituting the business in a legitimate service table;
registering the order of the processes constituting the business in the business sequence table;
determining whether or not the communication packet is a legitimate communication packet based on a collation result of the transmission source information and the transmission destination information included in the communication packet used for the communication of the business system with the transmission source device and the transmission destination device registered in the legitimate communication table;
identifying whether or not the communication packet is a communication packet constituting the business sequence based on a collation result of the transmission source information and the transmission destination information included in the legitimate communication packet with the client device and the server device related to the process registered in the legitimate service table;
determining whether or not the communication packet is the communication packet in the wait state by referring to the wait packet table based on the transmission source information and the transmission destination information included in the communication packets constituting the business sequence; and.

4. The communication monitoring method according to claim 1, further comprising:
collecting the communication packet from a business system that performs communication between the transmission source device and a transmission destination device according to the business sequence;
determining whether or not the communication packet is a legitimate communication packet based on the transmission source information and the transmission destination information included in the communication packet;
identifying whether or not the legitimate communication packet is the communication packet constituting the business sequence based on the transmission source information and the transmission destination information included in the communication packet used for the legitimate communication; and
determining whether or not the plurality of processes constituting the business defined by the business sequence is executed according to an order defined by the business sequence based on the transmission source information and the transmission destination information included in the communication packet used for the business sequence.

5. A communication monitoring apparatus that monitors a communication packet used for a business sequence, the communication monitoring apparatus comprising:
a processor coupled to a memory storing instructions,
wherein the processor determines whether or not a plurality of processes constituting a business defined by the business sequence is executed according to the business sequence based on transmission source information and transmission destination information included in the communication packet, and
wherein the communication monitoring apparatus:
generates an establishment wait sequence table indicating an execution state of the business sequence when a communication packet used for a first process constituting the business sequence is received;
generates a wait packet table that registers, as a set, a transmission source device and a transmission destination device designated by the communication packet in a wait state which is used for the business sequence specified by the establishment wait sequence table; and
determines whether or not the plurality of processes constituting the business defined by a business sequence table, which registers an order of the processes constituting the business, is executed according to the order defined by the business sequence table based on a determination result of whether or not the communication packet is the communication packet in the wait state.

6. A communication monitoring system, comprising:
a business system that performs communication between a transmission source device and a transmission destination device according to a business sequence, and executes a plurality of processes constituting a business defined by the business sequence; and
a communication monitoring apparatus that monitors a communication packet used for the communication of the business system,
wherein the communication monitoring apparatus comprises a processor coupled to a memory storing instructions, the processor determines whether or not the plurality of processes is executed according to the business sequence based on transmission source information and transmission destination information included in the communication packet, and
wherein the communication monitoring apparatus:
generates an establishment wait sequence table indicating an execution state of the business sequence when a communication packet used for a first process constituting the business sequence is received;
generates a wait packet table that registers, as a set, the transmission source device and the transmission destination device designated by the communication packet in a wait state which is used for the business sequence specified by the establishment wait sequence table; and
determines whether or not the plurality of processes constituting the business defined by a business sequence table, which registers an order of the processes constituting the business, is executed according to an order defined by the business sequence table based on a determination result of whether or not the communication packet is the communication packet in the wait state.

7. The communication monitoring system according to claim 6, wherein the transmission source information is an IP address of the transmission source device, and the transmission destination information is an IP address of the transmission destination device or a transmission destination port number.

8. The communication monitoring system according to claim 6, wherein the communication monitoring apparatus determines that the business sequence is not established when the process is not executed according to an order defined by the business sequence, and determines that an abuse using a legitimate communication between the transmission source device and the transmission destination device occurs when the business sequence is not established.

9. The communication monitoring system according to claim 8, wherein, when the business sequence is executed, the communication monitoring apparatus determines that the legitimate communication is abused in a case where the process constituting the business defined by the business sequence is omitted or duplicated.

10. The communication monitoring system according to claim 6, wherein the communication monitoring apparatus determines that an abuse using a legitimate communication between the transmission source device and the transmission destination device occurs when the plurality of processes constituting the business defined by the business sequence is not completed based on the communication between the transmission source device and the transmission destination device designated by the business sequence within an allowable time defined by the business sequence.

11. The communication monitoring system according to claim 6, wherein the instructions permits the processor to function as:
a packet collection processing unit that collects the communication packet used for the communication of the business system;
a legitimate communication determination processing unit that determines whether or not the communication packet is a legitimate communication packet based on the transmission source information and the transmission destination information included in the communication packets,
a sequence packet identification processing unit that identifies whether or not the legitimate communication packet is a communication packet constituting the business sequence based on the transmission source information and the transmission destination information included in the legitimate communication packet; and
a sequence establishment determination processing unit that determines whether or not the plurality of processes constituting the business defined by the business sequence is executed according to an order defined by the business sequence based on the transmission source information and the transmission destination information included in the communication packet constituting the business sequence.

12. The communication monitoring system according to claim 11, further comprising:
a legitimate communication table that registers, as a set, the transmission source device and the transmission destination device permitted in the communication of the business system;
a legitimate service table that registers, as a set, a client device and a server device used for the processes constituting the business; and
the business sequence table that registers the order of the processes constituting the business,
wherein the legitimate communication determination processing unit determines whether or not the communication packet is the legitimate communication packet based on a collation result of the transmission source information and the transmission destination information included in the communication packet used for the communication of the business system with the transmission source device and the transmission destination device registered in the legitimate communication table,
the sequence packet identification processing unit identifies whether or not the communication packet is the communication packet constituting the business sequence based on a collation result of the transmission source information and the transmission destination information included in the legitimate communication packet with the client device and the server device related to the process registered in the legitimate service table, and
the sequence establishment determination processing unit generates the establishment wait sequence table,
generates the wait packet table ,
determines whether or not the communication packet is the communication packet in the wait state by referring to the wait packet table based on the transmission source information and the transmission destination information included in the communication packet constituting the business sequence, and determines whether or not the plurality of processes constituting the business defined by the business sequence table is executed according to the order defined by the business sequence table based on the determination result of whether or not the communication packet is the communication packet in the wait state.

\* \* \* \* \*